US012792905B2

(12) United States Patent
Espeholt et al.

(10) Patent No.: US 12,792,905 B2
(45) Date of Patent: Nov. 10, 2026

(54) REINFORCEMENT LEARNING WITH CENTRALIZED INFERENCE AND TRAINING

(71) Applicant: Google LLC, Mountain View, CA (US)

(72) Inventors: Lasse Espeholt, Amsterdam (NL); Ke Wang, Mountain View, CA (US); Marcin M. Michalski, Pfäffikon (CH); Piotr Michal Stanczyk, Ruschlikon (CH); Raphaël Marinier, Paris (FR)

(73) Assignee: Google, LLC, Mountain View, CA (US)

( * ) Notice: Subject to any disclaimer, the term of this patent is extended or adjusted under 35 U.S.C. 154(b) by 1101 days.

(21) Appl. No.: 17/764,066

(22) PCT Filed: Sep. 25, 2020

(86) PCT No.: PCT/US2020/052821
§ 371 (c)(1),
(2) Date: Mar. 25, 2022

(87) PCT Pub. No.: WO2021/062226
PCT Pub. Date: Apr. 1, 2021

(65) Prior Publication Data

US 2022/0343164 A1 Oct. 27, 2022

Related U.S. Application Data

(60) Provisional application No. 62/906,028, filed on Sep. 25, 2019.

(51) Int. Cl.
*G06N 3/08* (2023.01)
*G06N 3/092* (2023.01)
(Continued)

(52) U.S. Cl.
CPC ............... *G06N 3/08* (2013.01); *G06N 3/092* (2023.01); *G06N 5/04* (2013.01); *G06N 3/096* (2023.01)

(58) Field of Classification Search
CPC ............ G06N 3/08; G06N 5/04; G06N 3/092; G06N 3/096
See application file for complete search history.

(56) References Cited

U.S. PATENT DOCUMENTS 11,625,604 B2 * 4/2023 Budden .................. G06N 3/088 706/25
2017/0024643 A1 * 1/2017 Lillicrap ................ G06N 3/006
(Continued)

FOREIGN PATENT DOCUMENTS

CN 105631697 A 6/2016
CN 109906132 A 6/2019
WO 2019149949 8/2019

OTHER PUBLICATIONS

Khan et al., Scalable Centralized Deep Multi-Agent Reinforcement Learning via Policy Gradients, May 2018 (Year: 2018).*
(Continued)

*Primary Examiner* — Shourjo Dasgupta
*Assistant Examiner* — Jacqueline C. Meyer
(74) *Attorney, Agent, or Firm* — Fish & Richardson P.C.

(57) ABSTRACT

Methods, systems, and apparatus, including computer programs encoded on computer storage media, for performing reinforcement learning with centralized inference and training One of the methods includes receiving, at a current time-step in a plurality of time-steps, a respective observation by an actor for each environment of a plurality of environments; obtaining, for each environment, a respective reward for the actor as a result of the actor performing a respective action at a previous time-step preceding the current time-step; processing, for each environment, the respective observation and respective reward through a policy model; providing, to the actor, the respective policy outputs for each of the plurality of environments; maintaining at a repository and for each environment, a respective
(Continued)

sequence of tuples corresponding to the actor; determining that a maintained sequence meets a threshold condition; and in response, training the policy model on the maintained sequence.

20 Claims, 4 Drawing Sheets

(51) Int. Cl.
*G06N 3/096* (2023.01)
*G06N 5/04* (2023.01)

(56) References Cited

U.S. PATENT DOCUMENTS

| | | | | |
|---|---|---|---|---|
| 2017/0076201 | A1* | 3/2017 | van Hasselt | G06N 3/08 |
| 2017/0228662 | A1* | 8/2017 | Gu | G06N 3/006 |
| 2018/0165602 | A1 | 6/2018 | Van Seijen et al. | |
| 2019/0232488 | A1* | 8/2019 | Levine | B25J 9/161 |
| 2019/0244099 | A1* | 8/2019 | Schaul | G06N 3/098 |
| 2020/0134445 | A1* | 4/2020 | Che | G06N 3/044 |
| 2020/0293883 | A1* | 9/2020 | Budden | G06N 3/045 |

OTHER PUBLICATIONS

Abadi et al., "TensorFlow: Large-scale machine learning on heterogeneous distributed systems," arXiv, Nov. 9, 2015, 19 pages.
Beattie et al., "Deepmind lab," arXiv, Dec. 13, 2016, pp. 1-11.
Bellemare et al., "The arcade learning environment: An evaluation platform for general agents," J. Artif. Intell. Res. (JAIR), Jun. 2013, 47:253-279.
Castro et al., "Dopamine: A Research Framework for Deep Reinforcement Learning," arXiv, Dec. 14, 2018, pp. 1-22.
Chen et al., "Revisiting distributed synchronous SGD," arXiv, Apr. 4, 2016, pp. 1-5.
Dalton et al., "Gpu-accelerated atari emulation for reinforcement learning," arXiv, Jul. 19, 2019, pp. 1-14.
Dean et al., "Large scale distributed deep networks," Advances in Neural Information Processing Systems 25 (NIPS), 2012, pp. 1-9.
Deverett et al., "Interval timing in deep reinforcement learning agents," arXiv, May 31, 2019, pp. 1-11.
Espeholt et al., "IMPALA: scalable distributed deep-rl with importance weighted actor-learner architectures," Proceedings of the 35th International Conference on Machine Learning, PMLR, 2018, vol. 80, 10 pages.
Espeholt et al., "SEED RL: Scalable and Efficient Deep-RL with Accelerated Central Inference," International Conference on Learning Representations (ICLR), Dec. 19. 2019, 1-20.
GitHub, "TF-Agents: A library for reinforcement learning in tensorflow," available on or before Jun. 2018, via Internet Archive: Wayback Machine URL <https://web.archive.org/web/20190623155258/https://github.com/tensorflow/agents>, retrieved from Jun. 25, 2019, URL<https://github.com/tensorflow/agents>, 3 pages.
Glorot et al., "Understanding the difficulty of training deep feedforward neural networks" Proceedings of the Thirteenth International Conference on Artificial Intelligence and Statistics, PMLR, 2010, 9:249-256.
Goyal et al., "Accurate, large minibatch SGD: training imagenet in 1 hour," arXiv, Jun. 8, 2017, pp. 1-12.
Gregor et al., "Shaping belief states with generative environment models for RL," arXiv, Jun. 21, 2019, pp. 1-22.
Hansen et al., "Fast task inference with variational intrinsic successor features," arXiv, Jun. 12, 2019, pp. 1-14.
Hasselt et al., "Deep reinforcement learning with double q-learning," Proceedings of the Thirtieth AAAI conference on artificial intelligence, Mar. 2, 2016, 30(1):2094-2100.
Hasselt et al., "Double Q-learning," Advances in Neural Information Processing Systems 23 (NIPS), 2010, pp. 1-9.
Hessel et al., "Multi-task deep reinforcement learning with popart," arXiv, Sep. 12, 2018, 12 pages.
Hessel et al., "Rainbow: Combining improvements in deep reinforcement learning," arXiv, Oct. 6, 2017, 14 pages.
Hochreiter et al., "Long short-term memory," Neural computation, Nov. 1997, 9(8):1-32.
Horgan et al., "Distributed prioritized experience replay," 6th International Conference on Learning Representations (ICLR), Feb. 15, 2018, 1-19.
International Preliminary Report on Patentability in International Appln. No. PCT/US2020/052821, mailed on Apr. 7, 2022, 15 pages.
International Search Report and Written Opinion in International Appln. No. PCT/US2020/052821, mailed on Jan. 28, 2021, 41 pages.
Kapturowski et al., "Recurrent experience replay in distributed reinforcement learning," International Conference on Learning Representations (ICLR), Dec. 20, 2018, 1-19.
Kingma et al., Adam: A method for stochastic optimization, arXiv, Dec. 22, 2014, pp. 1-15.
Kurach et al., "Google research football: A novel reinforcement learning environment," arXiv, Jul. 25, 2019, 12 pages.
Küttler et al., "TorchBeast: A PyTorch Platform for Distributed RL," arXiv, Oct. 8, 2019, 10 pages.
Li et al., "Cross-view policy learning for street navigation," arXiv, Jun. 13, 2019, 10 pages.
Liang et al., "Rllib: Abstractions for distributed reinforcement learning," arXiv, Jun. 29, 2018, 10 pages.
Mahmood, "Incremental Off-policy Reinforcement Learning Algorithms," PhD thesis, University of Alberta, 2017, 189 pages.
McCandlish et al., "An empirical model of large-batch training," arXiv, Dec. 14, 2018, 35 pages.
Mnih et al., "Asynchronous methods for deep reinforcement learning," Proceedings of the 33rd International Conference on Machine Learning, PMLR, 2016, vol. 48, 10 pages.
Mnih et al., "Human-level control through deep reinforcement learning," Nature, Feb. 25, 2015, vol. 518, 13 pages.
Nair et al., "Massively parallel methods for deep reinforcement learning," arXiv, Jul. 15, 2015, 14 pages.
Omidshafiei et al., "Neural replicator dynamics," csLG, Submitted on Jun. 1, 2019, arXiv:1906.00190, 23 pages.
Oord et al,. "Representation learning with contrastive predictive coding," arXiv, Jul. 10, 2018, pp. 1-13.
OpenAI.com, "Openai five," available on or before 2018, via Internet Archive: Wayback Machine URL <https://web.archive.org/web/20190914180013/https://openai.com/blog/openai-five/>, retrieved on Sep. 14, 2019, URL<https://openai.com/research/openai-five/>, 18 pages.
Pohlen et al., Observe and look further: Achieving consistent performance arXiv, May 29, 2018, pp. 1-19.
Raina et al., "Large-scale deep unsupervised learning using graphics processors," Proceedings of the 26th annual international conference on machine learning, ACM, Jun. 2009, 8 pages.
Salimans et al., "Evolution strategies as a scalable alternative to reinforcement learning," arXiv, Mar. 10, 2017 pp. 1-13.
Schaarschmidt et al., "Rlgraph: Modular computation graphs for deep reinforcement learning," arXiv, Oct. 21, 2018, 16 pages.
Schaul et al., "Prioritized experience replay," arXiv, Nov. 18, 2015, pp. 1-21.
Schulman et al., "Proximal policy optimization algorithms," arXiv, Jul. 20, 2017, pp. 1-12.
Silver et al., "Mastering the game of go with deep neural networks and tree search," nature, Jan. 28, 2016, vol. 529, 20 pages.
Stooke et al., "Accelerated methods for deep reinforcement learning," arXiv, Mar. 7, 2018, 16 pages.
Stooke et al., "rlpyt: A research code base for deep reinforcement learning in pytorch," arXiv, Sep. 3, 2019, pp. 1-11.
Such et al., "Deep neuroevolution: Genetic algorithms are a competitive alternative for training deep neural networks for reinforcement learning," arXiv, Dec. 18, 2017, 16 pages.
Sutton, "Learning to predict by the methods of temporal differences," Machine learning, Aug. 1988, 3:9-44.

(56) References Cited

OTHER PUBLICATIONS

Tian et al., "Elf: An extensive, lightweight and flexible research platform for real-time strategy games," Advances in Neural Information Processing Systems 30 (NIPS), 2017, 1-11.
Tirumala et al., "Exploiting hierarchy for learning and transfer in kl-regularized RL," arXiv, Mar. 18, 2019, 22 pages.
Veeriah et al., "Discovery of useful questions as auxiliary tasks," arXiv, Sep. 10, 2019, pp. 1-17.
Vezhnevets et al., "Options as responses: Grounding behavioural hierarchies in multi-agent rl," arXiv, Jun. 4, 2019, pp. 1-12.
Vinyals et al., "Starcraft ii: A new challenge for reinforcement learning," arXiv, Augest 16, 2017, pp. 1-20.
Wang et al., "Dueling network architectures for deep reinforcement learning, " Proceedings of the 33rd International Conference on Machine Learning, PMLR, Jun. 2016, 9 pages.
You et al., "Large batch optimization for deep learning: Training bert in 76 minutes," arXiv, Apr. 1, 2019, pp. 1-37.
You et al., "Large batch training of convolutional networks," arXiv, Aug. 13, 2017, pp. 1-8.
You et al., "Scaling sgd batch size to 32k for imagenet training," arXiv, Aug. 13, 2017, pp. 1-20.
Office Action in Chinese Appln. No. 202080044844.X, mailed on Jun. 26, 2025, 30 pages (with English translation).
Office Action in European Appln. No. 20789406.4, mailed on May 28, 2025, 10 pages.

* cited by examiner

REINFORCEMENT LEARNING WITH CENTRALIZED INFERENCE AND TRAINING

CROSS-REFERENCE TO RELATED APPLICATION

This application is a national phase entry under 35 U.S.C. 371 of PCT Application No. PCT/US2020/052821, filed on Sep. 25, 2020, which claims priority to U.S. Patent Application No. 62/906,028, filed on Sep. 25, 2019, the entire contents of which are herein incorporated by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies for performing reinforcement learning with a centralized policy model.

In one aspect, this specification relates to a method comprising receiving respective observations generated by respective actors for each environment of a plurality of environments; processing, for each environment, a respective policy input that includes the respective observation for the environment through a policy model to obtain a respective policy output for the actor; providing, to the respective actor for each of the environments, a respective action for the environment; obtaining, for each of the environments, a respective reward for the respective actor for the environment generated as a result of the provided action being performed in the environment; maintaining, for each environment, a respective sequence of tuples; determining that a maintained sequence meets a threshold condition; and in response, training the policy model on the maintained sequence.

Implementations may include one or more of the following features. The policy model have a plurality of model parameter values. The respective policy output defines a control policy for performing a task in the environment. The respective action is determined from the control policy defined by the respective policy output. At least one tuple of the respective sequence of tuples comprises a respective observation, an action, and a reward obtained in response to the actor performing the action in the environment. The respective sequence of tuples are stored in a priority replay buffer and sampled from the priority replay buffer to train the policy model. The policy input may include batches of respective policy model inputs, and the policy output may include batches of respective policy outputs for each of the batches of respective policy model inputs. The actors do not include the policy model.

The subject matter described in this specification can be implemented in particular embodiments so as to realize one or more of the following advantages.

By centralizing the policy model, a system implementing the subject matter of this specification can be easily scaled to process observations by an arbitrary number of actors in an arbitrary number of different environments. Because the policy model is centralized at the learner engine, the learner engine does not have to synchronize model parameter values and other values for the policy model across each actor interconnected to the learner engine. Instead, network traffic, i.e., data transferring, between actors and the learner engine is reduced to only inference calls by the actors to the learner engine, and actions generated by the learner engine in response to the inference calls.

Because inference and training are centralized, computationally more expensive and scarce computing resources can be centralized to execute and train the policy model, as opposed to executing the policy model on hardware implementing an actor engine that is computationally less efficient. For example, the learner engine can be implemented on a plurality of hardware accelerators, e.g., neural network accelerators such as tensor processing units ("TPUs"), with separate processing threads dedicated to processing inference calls, training, and data pre-fetching operations, e.g., batching training data, enqueuing data, or sending data to a priority replay buffer and/or a device buffer for one or more hardware accelerators. Actors do not have to alternate between operations for executing an action in an environment, and operations for generating new policy outputs defining future actions that are better suited for being performed on hardware accelerators.

The learning engine can adjust the ratio between accelerators configured to perform inference operations and accelerators configured to perform training operations automatically or in response to user input. In some implementations, the overall throughput of the system implementing the learner engine is improved for a particular ratio of inference-to-training assignments.

Additionally, the learner engine is configured to receive and respond to inference calls from the actors while maintaining training data for later updating parameter values for the policy model. The learner engine is configured to train the policy model on the maintained data, and once the policy model is trained, the learner engine is configured to respond to subsequent inference calls by processing received observations through the newly updated policy model and providing actions sampled from the newly updated policy model, thereby eliminating the need to individually update each actor with the updated policy model and improving system efficiency and accuracy.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
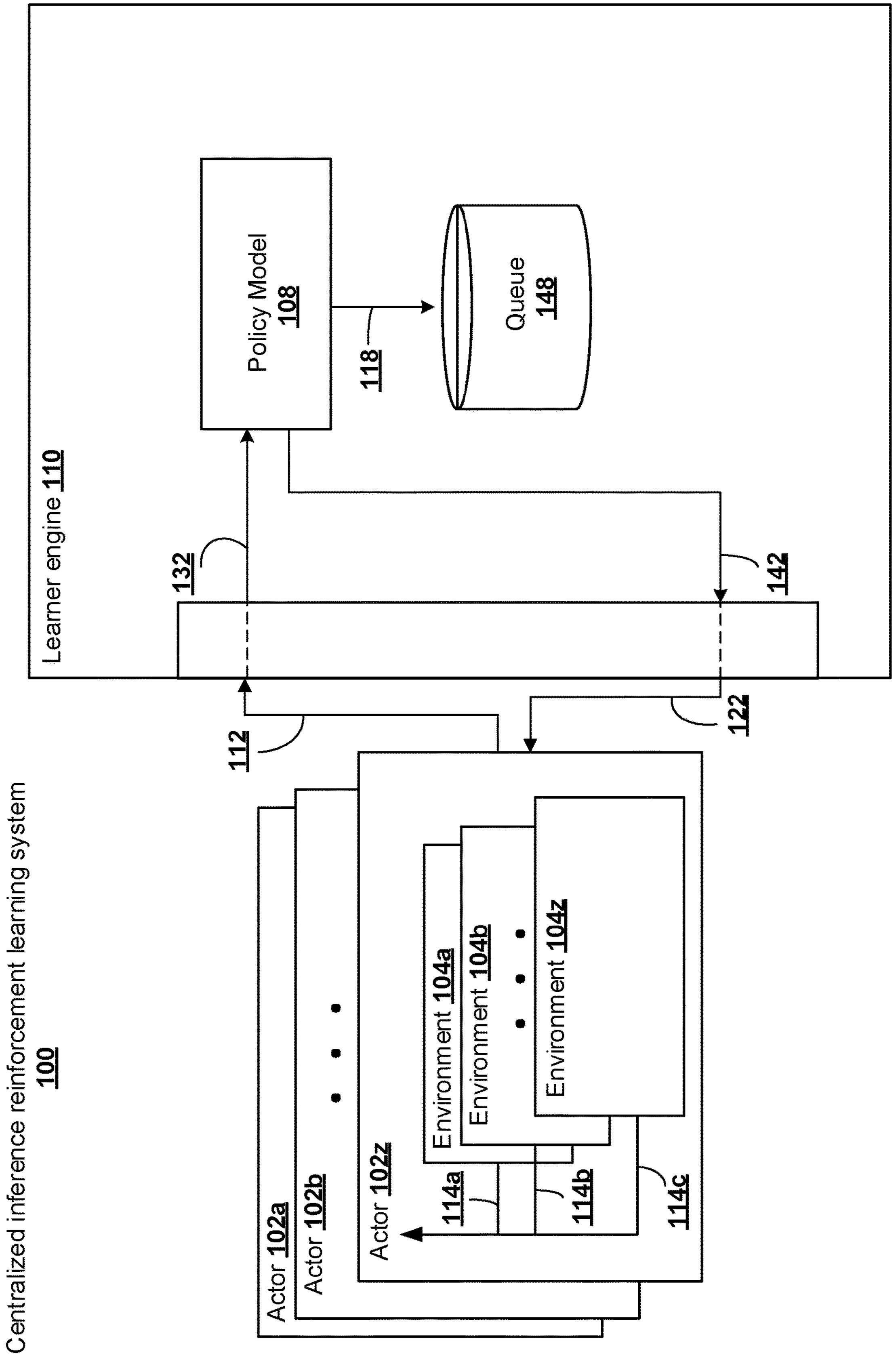
FIG. 1 shows an example centralized inference reinforcement learning system.

This specification generally describes a reinforcement learning system that trains a policy model in a centralized manner. The policy model is a machine learning model that is used to control an agent interacting with an environment, e.g., to perform a particular task in the environment, in response to observations characterizing states of the environment.

In some implementations, the environment is a real-world environment and the agent is a mechanical agent interacting with the real-world environment. For example, the agent may be a robot interacting with the environment, e.g., to locate an object of interest in the environment, to move an object of interest to a specified location in the environment, to physically manipulate an object of interest in the environment, and/or to navigate to a specified destination in the environment; or the agent may be an autonomous or semi-autonomous land, air, or sea vehicle navigating through the environment to a specified destination in the environment.

In these implementations, the observations may include, for example, one or more of images, object position data, and sensor data to capture observations as the agent interacts with the environment, for example sensor data from an image, distance, or position sensor or from an actuator.

For example in the case of a robot the observations may include data characterizing the current state of the robot, e.g., one or more of: joint position, joint velocity, joint force, overall orientation, torque and/or acceleration, for example gravity-compensated torque feedback, and global or relative pose of an item held by the robot.

In the case of a robot or other mechanical agent or vehicle the observations may similarly include one or more of the position, linear or angular velocity, force, torque and/or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

The actions may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

Training an agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment.

For example the simulated environment may be a motion simulation of a robot or vehicle, e.g., a driving simulation or a flight simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

Generally in the case of a simulated environment the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some applications, the environment is a content recommendation environment and the actions correspond to different items of content that can be recommend to a user. That is, each action is a recommendation of the corresponding item of content to the user. In these applications, the observations are data that represent the context of the content recommendation, e.g., data characterizing the user, data characterizing content items previously presented to the user, currently presented to the user, or both.

Optionally, in any of the above implementations, the observation at any given time step may include data from a previous time step that may be beneficial in characterizing the environment, e.g., the action performed at the previous time step, the reward received at the previous time step, or both.

Reinforcement learning systems, facilitated by accelerators such as tensor processing units (TPUs) and graphics processing units (GPUs), have demonstrated the capacity to perform tasks relating to distributed training at a large scale through processing a great amount of data collected from a plurality of environments, i.e., a plurality of versions of a target environment in which the agent will be controlled after the distributed training.

Generally, the various tasks performed by reinforcement learning systems during distributed training are inherently heterogeneous, i.e., the tasks are distinct from each other even in the same environment. For example, the distinct tasks can include observing environments and collecting data representing observations from the environments, making inference calls to the policy model using the collected data, generating policy outputs using the policy model in response to the inference calls, the policy outputs defining respective actions for actors to act in corresponding environments, and training the policy model based on the collected data.

The above-noted heterogeneous tasks require respective computation resources such as computation power, storage and data-transferring bandwidth and the total computational costs scale drastically with the increase of size of data observed from an environment, average complexity of the tasks the policy model is trained to perform, and the number of agents and environments in the reinforcement learning environment.

The described techniques can address the above-noted issues by efficiently assigning distributed training tasks to minimize the computational cost of performing the distributed training. In short, a system implemented using the described techniques centralizes tasks into a learner engine that trains the policy model and responds to inference calls from a plurality of distributed actors. In the meantime, the system distributes to the respective actors tasks such as observing data representing observations, i.e., current states and rewards, in respective environments and making inference calls to the learner engine for actions generated by the policy model based on the observed data. Therefore, the only data transfer that occurs between the learner engine and the distributed actors are data that represents observations and actions. Each distributed actor does not have to communicate with the learner engine to obtain the model parameters defining the policy model, nor to train the policy model.

FIG. 1 shows an example centralized inference reinforcement learning system 100. The system 100 is an example of a system implemented as computer programs on one or more computers in one or more locations, in which the systems, components, and techniques described below can be implemented.

The system 100 trains a policy model 108 that is used to control an agent, i.e., to select actions to be performed by the agent while the agent is interacting with an environment, in order to cause the agent to perform one or more tasks.

The policy model 108 is configured to receive a policy input that includes an input observation characterizing a state of the environment and to process the policy input to generate a policy output that defines a control policy for controlling an agent.

In some implementations, the policy output can be or can define a probability distribution over a set of actions that can be performed by the agent. The system can 100 can then sample from the probability distribution to obtain an action from the action set. Alternatively, the policy output can directly identify an action from the action set. As another example, the policy input can also include an action from the action set and the policy output can include a Q-value for the input action. The system can then generate a respective Q value for each action in the set of actions and then select the action based on the respective Q values, e.g., by selecting the action with the highest Q values or by transforming the Q values into a probability distribution and then sampling from the probability distribution.

In some implementations, the control policy used by the system allows for exploration of the environment by the agent. For example, the system can apply an exploration policy to the policy output, such as an epsilon greedy exploration policy.

In general, the policy model 108 can be implemented as a machine learning model. In some implementations, the policy model is a neural network having a plurality of layers that each have a respective set of parameters. The parameters of the neural network will collectively be referred to as "model parameters" in this specification.

In general, the policy model 108 can have any appropriate kind of neural network architecture. For example, the policy model 108 can be one or more convolutional neural networks, one or more recurrent neural networks, or any combination of both convolutional and recurrent neural networks. In implementations where the neural network includes a recurrent neural network, the policy model 108 can have a form of a long short-term memory ("LSTM") network, gated recurrent unit network, multiplicative LSTM network or LSTM network incorporated with attention.

The system 100 trains the policy model 108 in a centralized manner. To allow the system 100 to perform the centralized training, the system 100 includes a plurality of actors 102 and a learning engine 110 that can communicate with the plurality of actors 102, e.g., by sending data over a data communication network, a physical connection, or both. The actors 102 can send input data 112 to the learner engine 110 and receive output data 122 from the learner engine 110 through the communication network and/or the physical connection.

Each actor 102*a*-102*z* is implemented as one or more computer programs on one or more computers and is configured to observe one or more environments 104. In some cases, the actors 102*a*-102*z* can be implemented on the same computer while in other cases the actors 102*a*-102*z* are implemented on different computers from one another.

In other words, for each of the one or more environments 104, each actor 102*a*-102*z* is configured to control one or more respective replicas of the agent while the agent replica interacts with the environment 104, i.e., to select actions performed by the respective agent replica in response to observations characterizing at least states of the agent replica in the environment 104. Each agent replica is a respective version of the target agent that the policy model will be used to control after training. For example, when the target agent is a mechanical agent, each agent replica can be either a different instance of the same mechanical agent or a respective computer simulation of the mechanical agent. When the target agent is a simulated agent or other computerized agent, each agent replica is also a computerized agent. In this specification, an agent replica performing an action may also be referred to as the corresponding actor performing the action.

Each environment 104 is a version of the target environment in which the target agent will be deployed after training the policy model. In particular, each environment 104*a*-104*z* can be either a real-world environment or a simulated environment and, in some cases, one or more of the environments 104*a*-104*z* are real-world environments while one or more other environments are simulated environments.

To control an agent replica in a given environment at a given time step, an actor 102 receives an observation 114 for the time step that characterizes the state of the environment at the time step and provides input data 112 that represents the observation and optionally other data to the learner engine 110 to request output data 122 representing an action that should be performed by the agent replica in response to the observation. The actors 102 requesting for actions from the learner engine 110 using input data 112 can also be referred to as making inference calls to the learner engine 110.

In other words, rather than each actor 102 maintaining a separate copy of a trained policy model 108 and the learner engine 108 sending data representing parameters for the trained policy model to each actor, the actors 102 submit inference calls to the learner engine 100.

In response to each inference call, the learner engine 110 obtains a respective action using the policy model 108 and sends output data 122 to the actor that transmitted the inference call that identifies the action obtained using the policy model 108. The actor then causes the corresponding agent replica interacting to perform the received respective action in the corresponding environment.

Each of the actors 102 is associated with one or more environments 104. For example, the actor 102*z* is assigned with environments from 104*a*-104*z*. While each agent replica interacts with an environment 104, the corresponding actor 102*a*-102*z* can receive observations 114 from the corresponding environments 104 at each of multiple steps. For example, the actor 102*a* can receive observations 114*a* from the environment 104*a* at a time step of the multiple time steps. As another example, the actor 102*z* can receive observations 114*c* from the environment 104*z* at the time step of the multiple time steps. At each time step of the multiple time steps, each agent replica performs actions generated using the policy model 108 while controlled by a respective actor 102, wherein the received actions are generated from a policy model 108.

At each time step, each agent replica can also receive a reward in response to an action taken by the agent replica in a respective environment for the time step.

Generally, a reward is a numerical value, e.g., a scalar, and characterize a progress of the agent towards completing a task as of the time step at which the reward was received.

As a particular example, the reward can be a sparse binary reward that is zero unless the task is successfully completed in an episode and one if the task is successfully completed as a result of the action performed in the episode.

As another particular example, the reward can be a dense reward that measures a progress of the robot towards completing the task as of individual observations received at multiple time steps during an episode of attempting to perform the task.

The learner engine 110 includes the policy model 108 and a queue 148.

Generally, the learner engine 110 trains the policy model 108 in a centralized manner by repeatedly receiving input data 112 representing observations from the plurality of actors 102 and sending output data 122 representing actions for agent replicas to the plurality of actors 102. The output data 122 is generated from the policy model 108 as the policy model is trained by the learner engine 110. The input data 112 can further identify rewards received by the respective agent in response to taking actions in the corresponding environment for previous time steps.

As a particular example, the learner engine 110 can batch the input data 112 representing observations 114 from the actors 102 into batches of input data 132, i.e., into a batch of inputs that can be processed by the policy model 108 in parallel. In this specification, batches of input data 132 may also be referred to as batched inference.

The learner engine 110 can then process each batched inference 132 using the policy model 108 to generate a batch of output data 142 that specifies a respective action to be performed in response to each observation represented in the batched inference 132. In particular, the batch of output data 142 includes a respective policy output for each observation in the batched inference 132. In this specification, batches of output data 142 may also be referred to as batched actions.

The learner engine 110 can then select a respective action using each policy output using a control policy that is appropriate for the type of policy output that the policy model 108 generates, e.g., by sampling from a probability distribution or selecting an action with the highest Q value. Optionally, the learner engine 110 can apply an exploration policy when selecting each of the actions.

The learner engine 110 can then send output data 122 to each actor 102 that specifies the action to be performed by the agent replica controlled by the actor 102.

The learner engine 110 also stores training data 118 derived from the input data 112 and the output data 122 and that is related to training the policy model 108 in the queue 148. In particular, the learner engine 110 generates trajectories for each environment and stores the generated trajectories for each environment in the queue 148. A trajectory includes a sequence of tuples that each includes a respective observation, an action, and a reward obtained in response to action being performed the action in the environment. In some cases, when the trajectory ends at the termination of an episode of performing a task, the last tuple in the trajectory may not include an action and a reward, i.e., because the last observation characterizes the terminal state for the episode and no further actions were performed.

The learner engine 110 can then use the training data 118 stored in the queue 148 to repeatedly update the parameters of the policy model 108.

Figure 2:
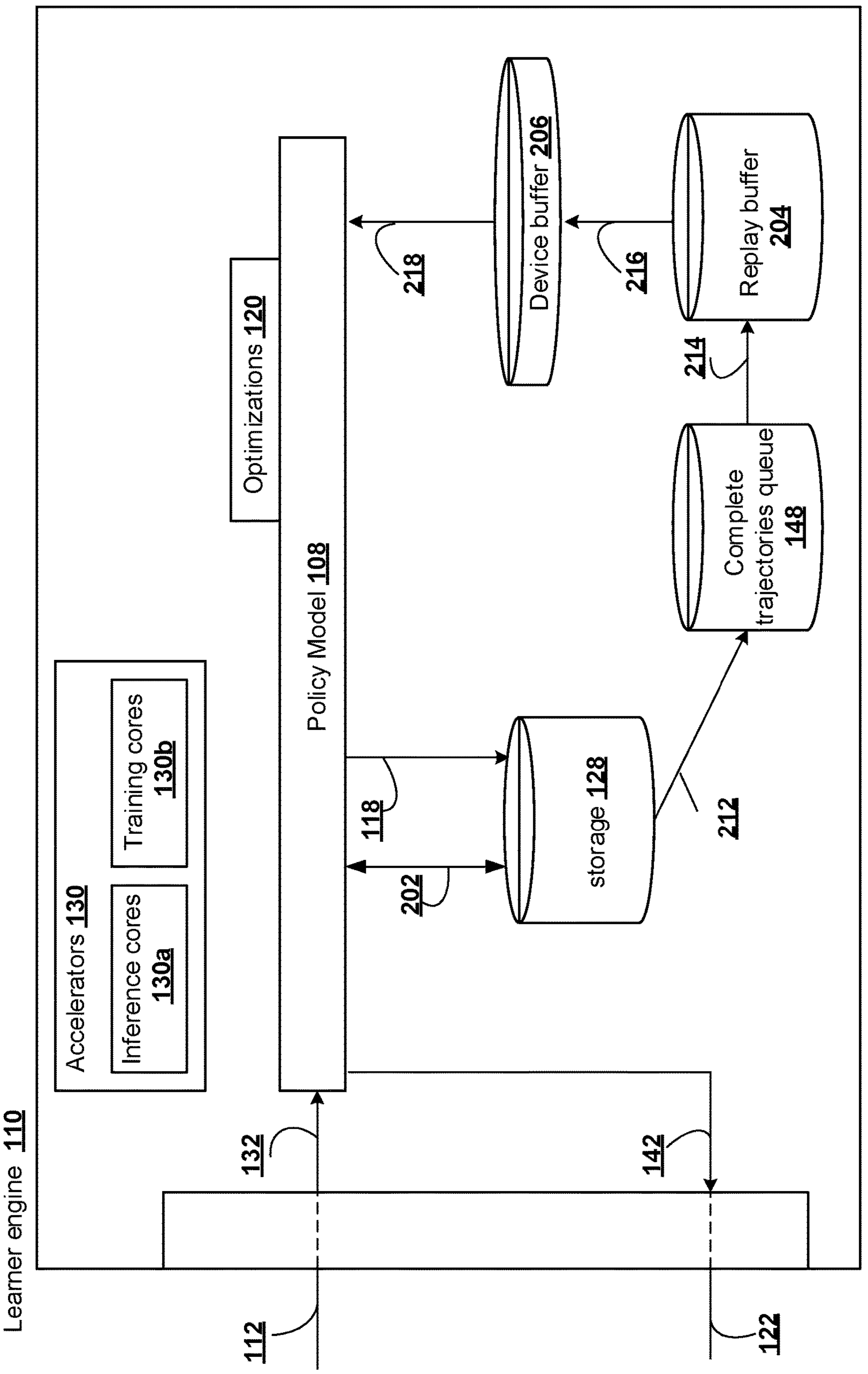
FIG. 2 illustrates in detail an example learner engine of the example centralized inference reinforcement learning system.

FIG. 2 illustrates in detail an example learner engine 110 of the example centralized inference reinforcement learning system 100.

The learner engine 100 includes a plurality of accelerators 130 that the engine 100 uses to perform tasks related to performing inference, i.e., related to providing actions to agents for performing in the environment, and tasks related to training the policy model 108.

Each accelerator includes one or more cores that can be assigned to perform a task. Generally, the accelerators 130 can be any processors that have suitable bandwidth and computation power for training neural networks, i.e., TPUs, GPUs, or certain types of central processing units (CPUs).

The plurality of cores of the accelerators 130 are assigned to two groups: inference cores 130*a* and training cores 130*b*. The inference cores 130*a* are configured to process respective policy inputs, i.e., the batched inference 132, using the policy model 108. The training cores 130*b* are cores different from the inference cores 130*a*, and are configured to train the policy model 108 based on maintained sequences of trajectories.

At each time step as the actors perform episodes of the task, the learner engine 110 generates one or more batched inference 132 based on input data 112. The learner engine 110 then processes the batched inference 132 using the policy model 108 in accordance with current values of the model parameters of the policy model 108. If the policy model 108 is based on one or more recurrent neural networks, the learner engine 100 also loads, if any, previously stored recurrent states 202 to the policy model 108. The learner engine 110 uses the policy model 108 to compute policy outputs and samples batched actions 142 for respective agent replicas in respective environments 104 based on the policy outputs using the inference cores 130*a*. If the policy model 108 is based on one or more recurrent neural networks, the learner engine 110 also obtains new recurrent states 202 for the time step as part of the output of the policy model and stores them for use at the next time step.

Next, the learner engine 110 integrates the batched actions 142 into output data 122 that represents actions for each agent replica in a respective environment at the time step and send the output data to respective actors. The actors receive the output data 112 from the learner engine 110 and instructs respective agent replicas to perform respective actions in respective environments.

The learner engine 110 stores tuples of data 118 generated using inference cores 130*a*, i.e., a group of data tuples each representing an observation, an action and a reward for a respective agent replica based on the batched inference 132 e.g., into dedicated storage 128. The tuples of data 118 stored in the storage 128 are considered to be incomplete trajectories, for respective environments until a predetermined length of trajectories or other predetermined condition is met, i.e., when the length for each trajectory of all agent replicas is above a threshold value.

The total time steps that a trajectory spans can be determined by the system 100 or the user. As described earlier, the total length of a trajectory can be arbitrary from one time step to all time steps of an episode.

As trajectories meet a predetermined length or other predetermined condition, e.g., the end of an episode, the trajectories become complete trajectories. The learner engine 110 transfers data 212 representing complete trajectories into the queue 148. For example, the queue 148 can be designed in a first-in-first-out (FIFO) manner such that the first trajectory for a respective agent replica stored in the queue is the first trajectory to be read out by the learner engine 110. The queue 148 is also referred to as complete trajectories queue.

The learner engine 110 then obtains data 214 representing a subset of complete trajectories for respective agent replicas into a priority replay buffer 204. The priority replay buffer 204 is a data structure configured to store data and implemented by computer programs based on the accelerators 130. The priority replay buffer can also be implemented in the FIFO manner. The learner engine 110 can transfer the complete trajectories 214 from the queue to the priority replay buffer using either inference cores 130*a* or training cores 130*b*. In some implementations, the learner engine 110 uses a plurality of threads of the accelerators 130 to transfer trajectories from storage 128 to queue 148, and to replay buffer 204.

The learner engine 110 samples trajectories from the replay buffer 204, e.g., at random or using a prioritized replay technique, and sends the sampled trajectories 216 to a device buffer 206 maintained by the training cores 130*b*. The device buffer is also a data structure configured to store data and implemented by computer programs based on accelerators 130.

The learner engine 110 trains the policy model 108 based on the sampled trajectories 218 using the training cores 130*b*, by performing optimizations 120 over an off-policy reinforcement learning algorithm, e.g., an actor-critic algorithm or other appropriate algorithm.

The learner engine 110 updates the trained policy model 108 on both inference cores 130*a* and training cores 130*b* synchronously. That is, in future time steps, the inference cores 130*a* of the learning engine 110 answers batched inference 132, and the training cores 130*b* of the learning engine 110 trains the policy model 108, based on the updated policy model, i.e., based on the updated values of the model parameters generated as a result of the training.

The learning engine 110 can be configured to train the policy model periodically based on some criteria, e.g., after a certain number of time-steps have elapsed, or at the end of an episode. The criteria for determining the completeness of trajectories can be the same as the criteria for periodically updating the policy model by the learner engine 110.

To optimize the usage of computation resources and minimize computational costs for the system 100, the system can adjust the ratio of the number of inference cores 130*a* to the number of training cores 130*b*. For example, for accelerators 130 having TPUs with 8 cores, the learner engine can assign 6 cores to the inference cores 130*a* and 2 cores to the training cores 130*b*, i.e., a ratio of 3. As another example, the accelerators 130 can have 32 cores with 20 cores assigned to the inference cores 130*a* and 12 cores assigned to the training cores 130*b*, i.e., a ratio of 1.67. In general, the system 100 can determine the ratio for best computation efficiency by training a policy model 108 with identical settings except that cores are assigned respectively based on different ratios. The system can choose one of the different ratios that yields the best computation performance. In some implementations, the user can overwrite the ratio selected by the system 100.

Figure 3A:
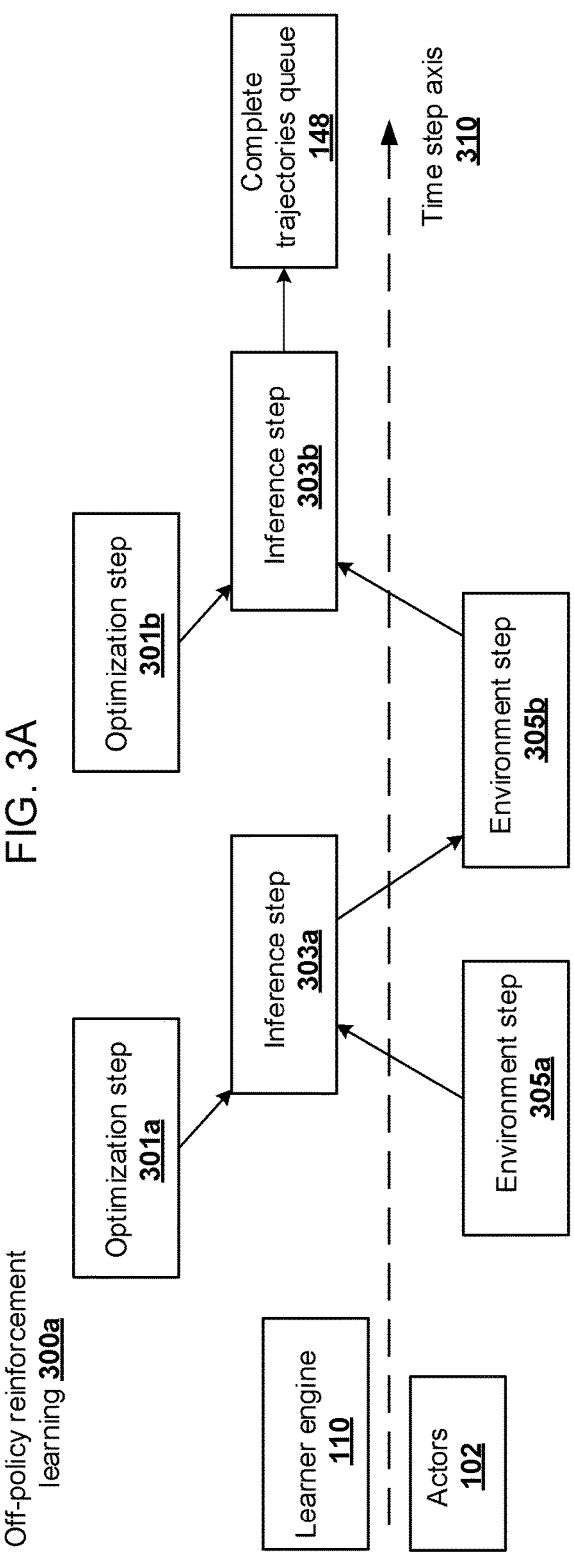
FIG. 3A illustrates an example off-policy reinforcement learning process utilized by the system.

FIG. 3A illustrates an example off-policy reinforcement learning process 300*a* utilized by the system 100.

In conventional off-policy reinforcement learning schemes, each tuple of data that forms a trajectory is obtained using an identical policy model. In other words, a given actor would use the same parameter values of the policy model to generate the entire trajectory, even though the policy model might have been updated by the learner engine while the trajectory was being generated.

The process 300*a*, on the other hand, allows for each tuple in the trajectory to be obtained through the most-recently updated policy model as of the time that the action in the tuple was selected. As shown in FIG. 3A, for a first time step along the time step axis 310, each actor of the plurality of actors 102 obtains data including observations at the environment step 305*a*, and makes inference calls to the learner engine 110. The learner engine 110 answers the inference calls by providing actions for actors 102 through the inference step 303*a* based on a policy model updated before the first time step, i.e., at the optimization step 301*a*. The actors 102 then instruct respective agent replicas to perform corresponding actions in the respective environments for the first time step causing each environment to transition into a state at the next environment time step 305*b*. At this time step, the actors 102 collect data including observations at the environment step 305*b* and make inference calls to the learner engine 100. The learner engine 100 then answers the inference calls at the inference step 303*b* based on the policy model updated through the optimization step 301*b* after the first step. Thus each tuple of actions, rewards and observations for respective agents are added to the trajectories based on the most-recently updated policy model until the end of the time step, i.e., the end of an episode, and the completed trajectories are transferred to the queue 148. Thus, as can be seen in FIG. 3A, the same trajectory includes actions selected using at least two different sets of parameter values, i.e., those generated at optimization step 301*a* and those generated at optimization step 301*b*

Figure 3B:
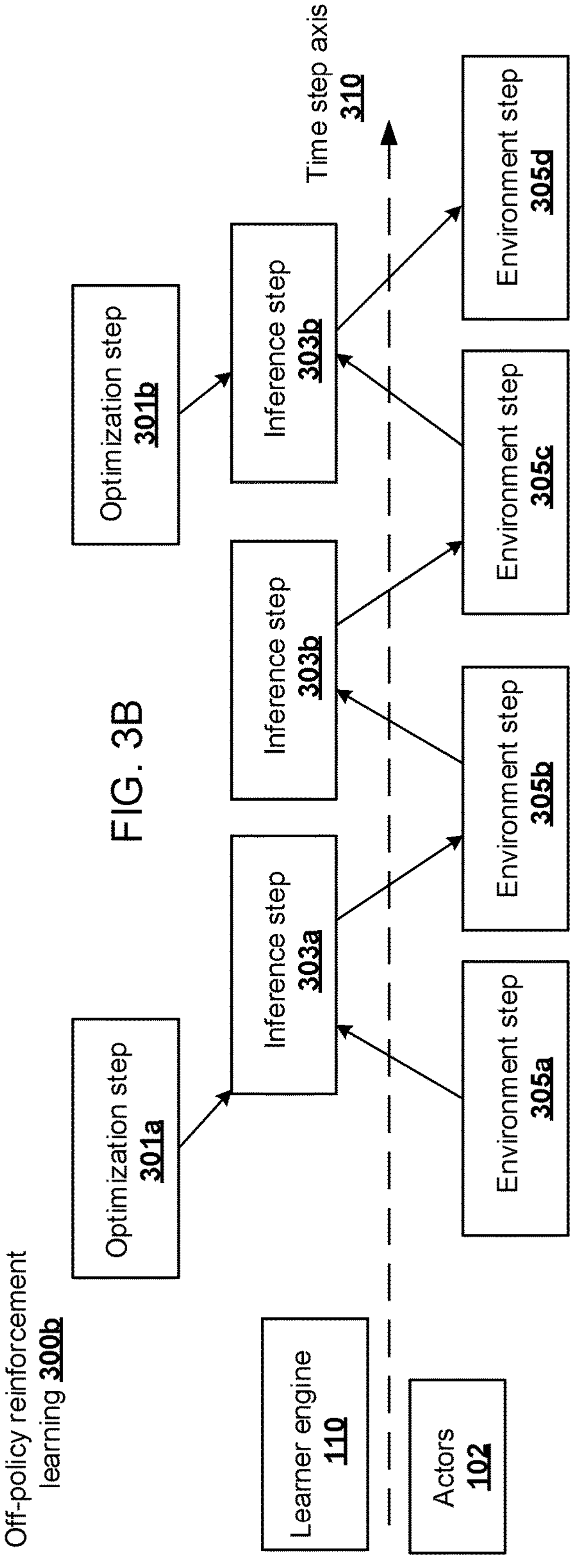
FIG. 3B illustrates another example off-policy reinforcement learning process utilized by the system.

FIG. 3B illustrates another example off-policy reinforcement learning process 300*b* utilized by the system 100.

Different from the example off-policy scheme shown in FIG. 3A, the frequency for updating a policy model, i.e., the frequency of the optimization steps can be less frequent than every time step. For example, the frequency can be every other time step. As shown in FIG. 3B, the learner engine 110 answers the inference calls from the actors 102 at the first and the second time steps using the policy model trained before the first time step through the optimization step 301*a*. However, at the third time step, the learner engine 110 answers the inference calls using an updated policy model trained after the second time step but before the third time step through the optimization step 301*b*. Even though the updating frequency shown in FIG. 3B is every other step for the ease of illustration, the updating frequency can be every three time steps, every ten time steps or more. In some implementations, the frequency can be time intervals based on computation time and can therefore be non-homogeneous. That is, the frequency can be different for different time steps along the time step axis 310. For example, a first update can be computed after the first time step and a second update can computed three time steps later. Even with this non-homogeneous frequency, however, the policy model can still be updated within a trajectory.

Figure 4:
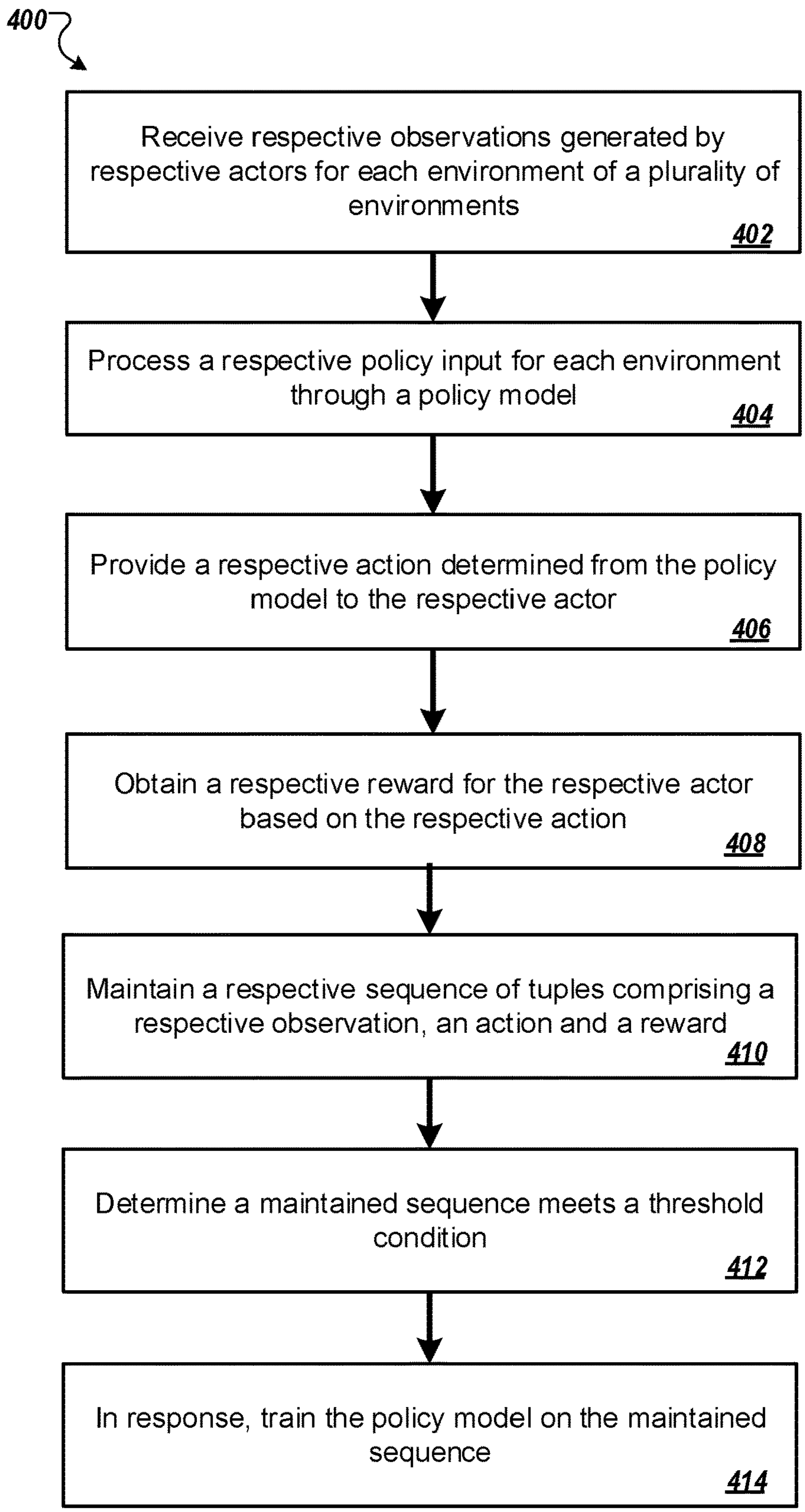
FIG. 4 illustrates an example process for centralized reinforcement learning.

FIG. 4 illustrates an example process for centralized reinforcement learning. For convenience, the process 400 will be described as being performed by a system of one or more computers located in one or more locations. For example, a centralized inference reinforcement learning system, e.g., the system 100 of FIG. 1, appropriately programmed, can perform the process 400.

In particular, the system can repeatedly perform steps 402-406 of the process to generate training data for training the policy model.

The system receives respective observations generated by respective actors for each environment of a plurality of environments (step 402).

The system processes a respective policy input for each environment through the policy model to obtain a respective policy output for the actor that defines a control policy for performing a task in the environment (step 404). The respective policy input for each environment includes an observation characterizing the state of the environment. In some implementations, the respective policy input further includes a stored recurrent state if the policy model is a recurrent neural network. The system can maintain and store a separate recurrent state for each environment to ensure that the policy model is conditioned on the appropriate data.

The system provides, to the respective actor for each of the environment, a respective action determined from the control policy defined by the respective policy output for the environment (step 406). The respective actor then instructs a corresponding agent replica to perform the respective action in the respective environment to cause the environment to transition into a new state and then receives a reward from the environment.

The system obtains a respective reward for each respective actor generated as a result of the provided action being performed in the environment (step 408).

The system maintains, for each environment, a trajectory, i.e., a respective sequence of tuples that each a respective observation, a respective action and a respective reward (step 410). That is, each time the system receives an observation for a given environment, provides an action to the agent for the given environment, and then receives a reward in response to the provided action being performed, the system generates a tuple and adds it to the trajectory for the given environment.

The system determines that the maintained sequence meets a threshold condition (step 412). As mentioned earlier, the threshold condition can be the length of the sequence of tuples reaching a threshold value, or episode of the task terminating.

In response, the system trains the policy model 108 on the maintained sequence (step 414). For example, the system can train the policy model 108 on the maintained sequence using an off-policy reinforcement learning technique.

By repeatedly training the policy model 108 on maintained sequences generated using the techniques described above, the system trains the policy model 108 to allow the policy model to effectively be used to control the agent to perform a task.

This specification uses the term “configured” in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

receiving, at a centralized learner system, respective observations generated by respective actors for each environment of a plurality of environments;

processing, by the centralized learner system for each environment, a respective policy input that includes the respective observation for the environment through a policy model having a plurality of model parameter values to obtain a respective policy output for the actor that defines a control policy for performing a task in the environment;

providing, from the centralized learner system to the respective actor for each of the environments, a respective action determined from the control policy defined by the respective policy output for the environment;

obtaining, for each of the environments, a respective reward for the respective actor for the environment generated as a result of the provided action being performed in the environment;

maintaining, by the centralized learner system for each environment, a respective sequence of tuples associated with at least a portion of an episode, at least one tuple comprising a respective observation, an action, and a reward obtained in response to the actor performing the action in the environment;

determining, by the centralized learner system, that a maintained sequence meets a threshold condition; and in response, training, by the centralized learner system, the policy model on the maintained sequence, wherein actions in a first subset of the maintained sequence of tuples associated with at least the portion of the episode are obtained in accordance with the policy model having a first set of model parameter values, and actions in a second subset of the maintained sequence of tuples associated with at least the portion of the episode that are different from the first subset are obtained in accordance with the policy model having a second set of model parameters that (i) are different from the first set of model parameter values and (ii) have been updated by the centralized learner system during the episode.

2. The method of claim 1, further comprising:

causing the actor to perform, in an environment, a respective action defined by the respective policy output provided to the actor.

3. The method of claim 2, wherein the environment is a real-world environment, and wherein causing the actor to perform, in the environment, the respective action defined by the respective policy output provided to the actor comprises:

causing the actor to send one or more inputs to a real-world agent in the real-world environment corresponding to the respective action, wherein the real-world agent is configured to receive the one or more inputs from the actor and perform the respective action in the real-world environment.

4. The method of claim 2, wherein the environment is a simulated environment, and wherein causing the actor to perform, in the environment, the respective action defined by the respective policy output provided to the actor comprises:

causing the actor to execute the respective action in the simulated environment.

5. The method of claim 1, wherein obtaining, for each environment, a respective reward for the actor as a result of the actor performing a respective action at a previous time step preceding the current time step comprises:

generating, for each environment, the respective reward from the respective observation received for the environment.

6. The method of claim 1, wherein maintaining the respective sequence for each environment comprises:

generating, for an environment of the plurality of environments, a tuple comprising:

(i) a respective observation received by an actor for the environment, (ii) a respective action provided to the actor for the environment, and (iii) a respective reward for a respective actor for the environment generated as a result of the actor performing the respective action in the environment; and adding the tuple to a respective sequence of tuples associated with at least the portion of the episode corresponding to the environment and the actor.

7. The method of claim 1, wherein the policy model is a long short term memory (LSTM) neural network, and wherein processing, for each environment, the respective observation and respective reward through the policy model comprises maintaining a recurrent state for the LSTM neural network.

8. The method of claim 1, wherein training the policy model comprises training the policy model using an off-policy reinforcement learning technique.

9. The method of claim 1, wherein training the policy model further comprises:

adding tuples of maintained sequences to a priority replay buffer; and training the policy model on tuples sampled from the priority replay buffer.

10. The method of claim 1, wherein processing, for each environment, the respective policy input comprises:

batching the respective policy inputs; and processing the batched policy input through the policy model to obtain a batched policy output that comprises a respective policy output for each policy input in the batched policy input.

11. The method of claim 1, wherein the respective actors do not comprise the policy model.

12. The method of claim 1, wherein receiving the respective observations generated by the respective actors for each environment comprises receiving the respective observations as part of one or more remote procedure calls.

13. The method of claim 1, wherein processing, for each environment, the respective policy input comprises processing, for each environment, the respective policy input on one or more first hardware accelerators of a plurality of hardware accelerators, and wherein training the policy model on the maintained sequence comprises training the policy model on one or more second hardware accelerators of the plurality of hardware accelerators that are different from the one or more first hardware accelerators; and wherein the one or more first hardware accelerators and the one or more second hardware accelerators define a predetermined ratio of hardware accelerators.

14. One or more non-transitory computer-readable storage media storing instructions that when executed by one or more computers cause the one or more computers to perform operations, the operations comprising:

receiving, at a centralized learner system, respective observations generated by respective actors for each environment of a plurality of environments;

processing, by the centralized learner system for each environment, a respective policy input that includes the respective observation for the environment through a policy model having a plurality of model parameter values to obtain a respective policy output for the actor that defines a control policy for performing a task in the environment;

providing, from the centralized learner system to the respective actor for each of the environments, a respective action determined from the control policy defined by the respective policy output for the environment;

obtaining, for each of the environments, a respective reward for the respective actor for the environment generated as a result of the provided action being performed in the environment;

maintaining, by the centralized learner system for each environment, a respective sequence of tuples associated with at least a portion of an episode, at least one tuple comprising a respective observation, an action, and a reward obtained in response to the actor performing the action in the environment;

determining, by the centralized learner system, that a maintained sequence meets a threshold condition; and in response, training, by the centralized learner system, the policy model on the maintained sequence, wherein actions in a first subset of the maintained sequence of tuples associated with at least the portion of the episode are obtained in accordance with the policy model having a first set of model parameter values, and actions in a second subset of the maintained sequence of tuples associated with at least the portion of the episode that are different from the first subset are obtained in accordance with the policy model having a second set of model parameters that (i) are different from the first set of model parameter values and (ii) have been updated by the centralized learner system during the episode.

15. The one or more non-transitory computer-readable storage media of claim 14, further comprising:

causing the actor to perform, in an environment, a respective action defined by the respective policy output provided to the actor.

16. The one or more non-transitory computer-readable storage media of claim 15, wherein the environment is a real-world environment, and wherein causing the actor to perform, in the environment, the respective action defined by the respective policy output provided to the actor comprises:

causing the actor to send one or more inputs to a real-world agent in the real-world environment corresponding to the respective action, wherein the real-world agent is configured to receive the one or more inputs from the actor and perform the respective action in the real-world environment.

17. The one or more non-transitory computer-readable storage media of claim 15, wherein the environment is a simulated environment, and wherein causing the actor to perform, in the environment, the respective action defined by the respective policy output provided to the actor comprises:

causing the actor to execute the respective action in the simulated environment.

18. The one or more non-transitory computer-readable storage media of claim 14, wherein maintaining the respective sequence for each environment comprises:

generating, for an environment of the plurality of environments, a tuple comprising:

(i) a respective observation received by an actor for the environment, (ii) a respective action provided to the actor for the environment, and (iii) a respective reward for a respective actor for the environment generated as a result of the actor performing the respective action in the environment; and adding the tuple to a respective sequence of tuples associated with at least the portion of the episode corresponding to the environment and the actor.

19. A system comprising one or more computers and one or more storage devices storing instructions that when executed by one or more computers cause the one or more computers to perform operations, the operations comprise:

receiving, at a centralized learner system, respective observations generated by respective actors for each environment of a plurality of environments;

processing, by the centralized learner system for each environment, a respective policy input that includes the respective observation for the environment through a policy model having a plurality of model parameter values to obtain a respective policy output for the actor that defines a control policy for performing a task in the environment;

providing, from the centralized learner system to the respective actor for each of the environments, a respective action determined from the control policy defined by the respective policy output for the environment;

obtaining, for each of the environments, a respective reward for the respective actor for the environment generated as a result of the provided action being performed in the environment;

maintaining, by the centralized learner system for each environment, a respective sequence of tuples associated with at least a portion of an episode, at least one tuple comprising a respective observation, an action, and a reward obtained in response to the actor performing the action in the environment;

determining, by the centralized learner system, that a maintained sequence meets a threshold condition; and in response, training, by the centralized learner system, the policy model on the maintained sequence, wherein actions in a first subset of the maintained sequence of tuples associated with at least the portion of the episode are obtained in accordance with the policy model having a first set of model parameter values, and actions in a second subset of the maintained sequence of tuples associated with at least the portion of the episode that are different from the first subset are obtained in accordance with the policy model having a second set of model parameters that (i) are different from the first set of model parameter values and (ii) have been updated by the centralized learner system during the episode.

20. The system of claim 19, wherein maintaining the respective sequence for each environment comprises:

generating, for an environment of the plurality of environments, a tuple comprising:

(i) a respective observation received by an actor for the environment, (ii) a respective action provided to the actor for the environment, and (iii) a respective reward for a respective actor for the environment generated as a result of the actor performing the respective action in the environment; and adding the tuple to a respective sequence of tuples associated with at least the portion of the episode corresponding to the environment and the actor.

* * * * *